United States Patent [19]

Nishinakagawa

[11] B 3,983,579
[45] Sept. 28, 1976

[54] TWO-CHANNEL AND FOUR-CHANNEL CARTRIDGE TAPE PLAYER

[75] Inventor: Motoshi Nishinakagawa, Iwaki, Japan

[73] Assignee: Alps Motorola, Inc., Tokyo, Japan

[22] Filed: July 10, 1974

[21] Appl. No.: 487,411

[44] Published under the second Trial Voluntary Protest Program on February 24, 1976 as document No. B 487,411.

[30] Foreign Application Priority Data
July 13, 1973 Japan.................................. 48-79081

[52] U.S. Cl. .................................. 360/78; 360/106
[51] Int. Cl.² .................. G11B 21/08; G11B 23/04; G11B 5/54; G11B 5/56
[58] Field of Search .............. 360/78, 106, 94, 92, 360/105, 93

[56] References Cited
UNITED STATES PATENTS

| | | | |
|---|---|---|---|
| 3,492,005 | 1/1970 | Ueno et al. ........................ | 360/78 |
| 3,532,347 | 10/1970 | Parsons ............................. | 360/106 |
| 3,592,476 | 7/1971 | MacDonald ....................... | 360/78 |
| 3,601,409 | 8/1971 | Marshall ........................... | 360/106 |
| 3,730,532 | 5/1973 | Miyamoto .......................... | 360/106 |
| 3,839,737 | 10/1974 | Vogel ................................. | 360/106 |
| 3,846,838 | 11/1974 | Okamoto ........................... | 360/106 |
| 3,869,717 | 3/1975 | Kawada ............................. | 360/106 |

OTHER PUBLICATIONS
B350,589, Jan. 1975, Tozawa, 360/78.

*Primary Examiner*—Alfred H. Eddleman
*Attorney, Agent, or Firm*—James W. Gillman; Donald J. Lisa

[57] ABSTRACT

A two-channel and four-channel cartridge tape player including a ganged multi-pole changeover switch, magnetic tape head means having four magnetic pick-up areas, a rotary switch having a first switch portion and a second switch portion and a four-stepped head shifting cam. Drive means is provided for advancing the four-stepped head shifting cam and includes a solenoid actuated by the second switch portion which engages and moves the four-stepped head shifting cam to contact a coupling member mounted to the capstan drive shaft which rotates the cam to the next tape track. When a four-channel tape cartridge is in the play position, the head shifting cam rotates two successive tape tracks to provide continuous tape play.

4 Claims, 3 Drawing Figures

TWO-CHANNEL AND FOUR-CHANNEL CARTRIDGE TAPE PLAYER

BACKGROUND OF THE INVENTION

The present invention is directed generally to cartridge tape players, and more particularly to a two-channel and four-channel cartridge tape player in which the changeover of two-channel play to four-channel play or vice versa is automatically made in accordance with which one of two-channel cartridges or four-channel cartridges is inserted therein.

For the better understanding of the features and advantages of the present invention, two-channel and four-channel cartridge tape players now commercially available, will first be described with reference to FIG. 1. FIG. 1 is essentially a circuit diagram of a two-channel and four-channel cartridge tape player and illustrates only the circuit arrangement for an understanding of prior art.

In the prior art devices, when a two-channel tape cartridge is inserted into the tape player, a multi-pole change-over switch SW1, which is illustrated as a ganged slide switch, determines which one of a two-channel or four-channel cartridge is inserted therein, and is switched into the state shown in FIG. 1. Thus the tape player starts to play the two-channel tape cartridge. Assuming that a block of magnetic head H is at higher level being elevated by a head shifting cam 1, the signal recorded on the first recording track 1' is picked up by a magnetic head H1 and reproduced through both speaker $SP_1$ and $SP_2$, and the signal recorded on the fifth recording track 5' is picked up by a magnetic head $H_5$ and reproduced through both speaker $SP_3$ and $SP_4$. When the full length of the first and fifth recording tracks 1' and 5' (Channel-1) are finished playing in the two-channel stereo mode, an electrically conducting spot adhered to the tape short-circuits contactor 3 to cause means for rotating the head shifting cam 1 such as, for example, an electromagnetic solenoid 2 to rotate one step, so that the block of magnetic head H descends to its next lower level. The descending action of the head block H causes a switch 3 to close. Thus, the second and sixth recording tracks 2' and 6' (Channel-2) are picked up by the magnetic heads $H_1$ and $H_3$ respectively and reproduced through the speakers $SP_1$, $SP_2$ and $SP_3$, $SP_4$. When the full length of the recording tracks 2' and 6' are finished playing, the electrically conducting spot short-circuits the contactor 3. At this time, because the switch $SW_3$ is closed, a relay RY is energized to switch another changeover switch $SW_2$ to cause magnetic heads $H_2$ and $H_4$ to come into operation. The solenoid 2 is energized again to rotate the head shifting cam 1 so as to shift up the head block H back to the original higher level. Thus, signals recorded on the third and seventh recording tracks 3' and 7' (Channel-3) are picked up to play by the magnetic heads $H_2$ and $H_4$ respectively. After the third and seventh tracks 3' and 7' are finished playing, the head group H is descended again to the next lower level to play the fourth and eighth recording tracks 4' and 8' (Channel-4) through the heads $H_2$ and $H_4$.

When a four-channel tape cartridge is inserted into the tape player, the multi-pole changeover switch $SW_1$ is switched into the state opposite to that shown in FIG. 1 (not shown). Assuming that the head block H is at its highest level, signals recorded on the first, third, fifth and seventh recording tracks 1', 3', 5' and 7' are picked up respectively by the magnetic heads $H_1$, $H_2$, $H_3$ and $H_4$. When the full length of the tape is finished playing, the solenoid 2 is energized by the short-circuit of the contactor 3 to cause the head block H to descend to the next lower tape tracks. The signals recorded on the second, fourth, sixth and eighth recording tracks 2', 4', 6' and 8' are then played respectively by the magnetic heads $H_1$, $H_2$, $H_3$ and $H_4$. Thus, on every one round of the tape, the head block H is shifted up and down to play, respectively, each of the recording tracks in four-channel mode.

From the foregoing description, it is apparent that in a two-channel and four-channel cartridge tape player according to the prior art, a two-stepped head shifting cam, a switch $SW_3$ related to the position of the head block H, a relay RY, and a changeover switch for amplifiers are provided to play two-channel cartridge as well as four-channel, which necessitates complicated construction and results in a less reliable operation. Furthermore, because two-channel cartridge tape players generally require a four-stepped head shifting cam, the employment of a two-stepped head shifting cam for four-channel cartridge play will bring inevitably about the changes in design of the tape player which increase the cost and the relative size of the tape player.

SUMMARY OF THE INVENTION

It is, therefore, an important object of the present invention to provide a two-channel and four-channel cartridge tape player of simple construction with little changes in design of two-channel cartridge tape players of the prior art.

The improved two-channel and four-channel cartridge tape player of the instant invention, however, both as to its construction and its mode of operation, together with additional features and advantages thereof, is best understood by the following detailed description of one embodiment with reference to the accompanying drawings.

DETAILED DESCRIPTION OF THE INVENTION

Figure 1:
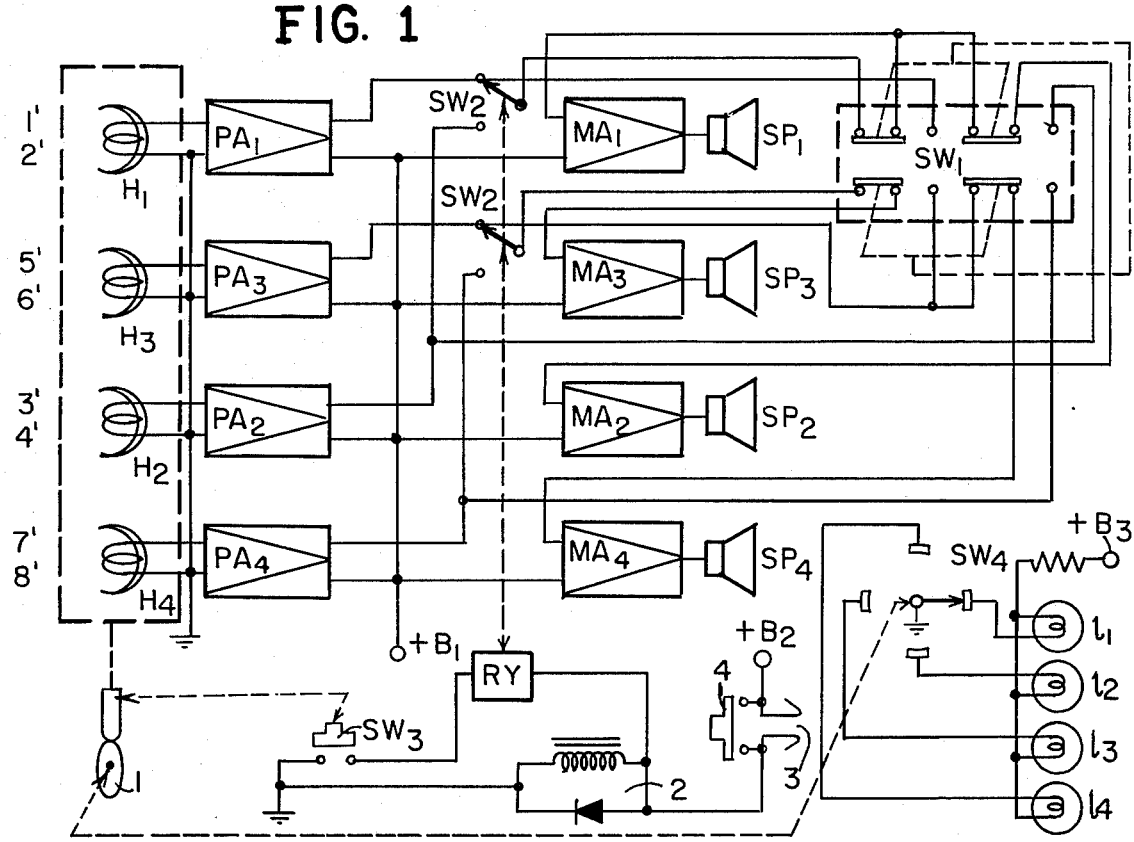
FIG. 1 is a circuit diagram of a two-channel and a four-channel cartridge tape player in accordance with the prior art.
Figure 2:
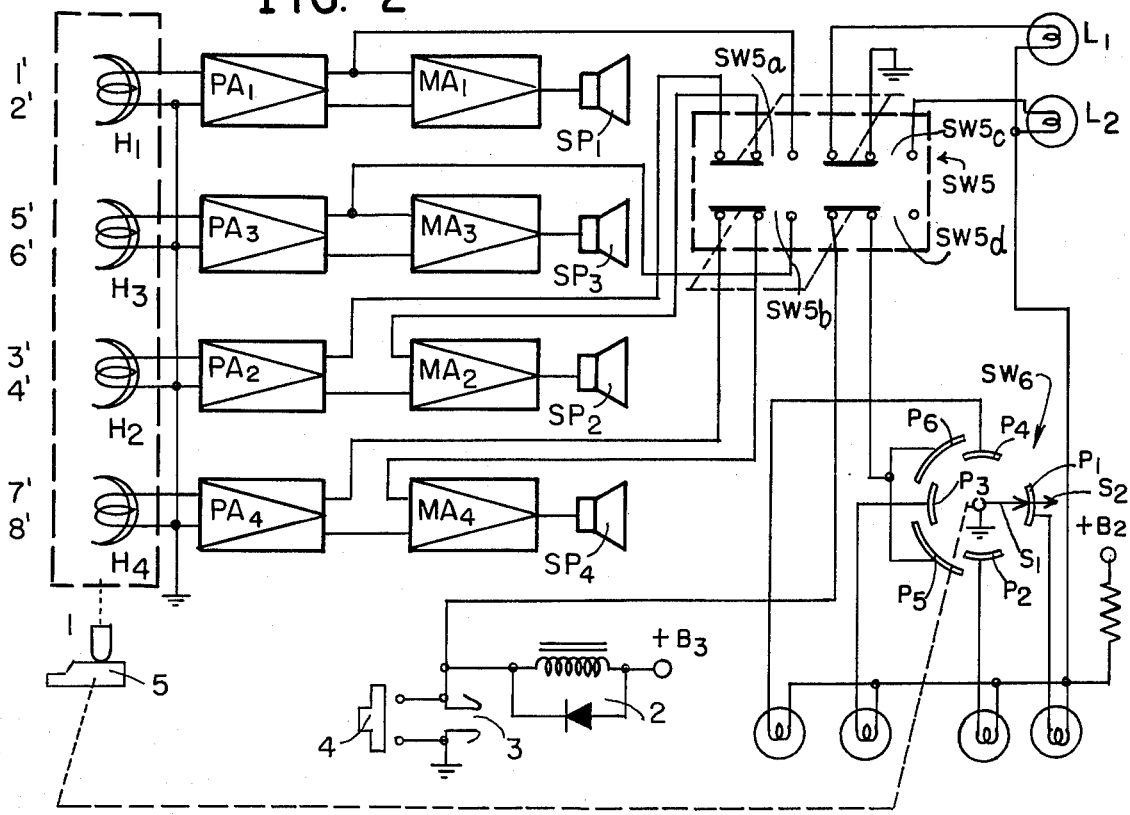
FIG. 2 is a circuit diagram of a two-channel and a four-channel cartridge tape player in accordance with the present invention and, FIG. 3 is a diagrammatic view of a head shifting mechanism employed in the two-channel and four-channel cartridge tape player as shown in FIG. 2.

Now referring to FIG. 2, in which the same symbols or reference numerals indicate the same components as shown in FIG. 1. Symbol SW5 indicates a ganged multi-pole changeover switch and includes switches SW5a and SW5b for switching to amplifiers $MA_1$, $MA_2$, $MA_3$ and $MA_4$, and switch SW5c for switching to indicator lamps $L_1$ and $L_2$, which lamps indicate which one of two-channel cartridge or four-channel cartridge is playing. The changeover switch SW5 also includes a switch SW5d which is adapted to cause the magnetic head block H to shift two steps continuously when a four-channel cartridge tape is in play, as will hereinafter be described.

Symbol SW6 indicates a ganged rotary switch consisting of a first rotary switch portion and the second rotary switch portion, which is coupled to a four-stepped head shifting cam 5. The first rotary switch portion includes a rotary contact $S_1$ and four stationary contacts $P_1$, $P_2$, $P_3$ and $P_4$ for switching four indicator lamps $l_1$, $l_2$, $l_3$ and $l_4$, and the second rotary switch includes a rotary contact $S_2$ and two stationary contacts $P_5$ and $P_6$ is related to the switch SW5$d$ of the changeover switch SW5 so as to control the continuous two step shifting of the head block H.

Operating of the two-channel and four-channel cartridge tape player constructed in accordance with the present invention as described above will now be described. When a four-channel tape cartridge has been inserted into the player, the changeover switch SW5 is switched into the state shown in FIG. 2. Assuming that the head block H is at its highest level, the signals recorded on the first, third, fifth and seventh recording tracks are picked up by the magnetic heads $H_1$, $H_2$, $H_3$ and $H_4$, respectively, so as to be reproduced through the speakers $SP_1$, $SP_2$, $SP_3$ and $SP_4$, thereby playing four-channel stereophonic sound. During this play condition, the rotary contact $S_1$ of the first rotary switch portion of the ganged rotary switch SW6 is in contact with the stationary contact $P_1$ to cause the indicator lamp $l_1$ to be on, and the switch SW5$c$ causes the mode indicator lamp $L_1$ to be on.

When the full length of the tape is finished playing, the electrically conducting spot located and secured to the end of the tape track engages contactor 3 and short-circuits the contactor 3 so as to cause the drive means for rotating the head shifting cam 5, as will hereinafter be described, such as the electro-magnetic solenoid 2, to rotate the four-stepped head shifting cam 5 one step (one-fourth of rotation), such that the head block H descends to the next elevation or the second highest tape track level. At the same time, both the rotary contacts $S_1$ and $S_2$ of the rotary switch SW6, coupled to the head shifting cam 5, are rotated one step or one-fourth rotation such that the rotary contact $S_1$ comes into contact with the stationary contact $P_2$ to cause the indicator lamp $l_2$ to turn on. Thus, the signals recorded on the second, fourth, sixth, and eighth recording tracks are picked up respectively by the magnetic head $H_1$, $H_2$, $H_3$ and $H_4$.

When the second, fourth, sixth, and eighth recording tracks are finished playing, the head shifting cam 5 is rotated one step or one-fourth rotation in the same manner as described above to cause the head block H to descend down to the next elevation or the third highest level, and, at the same time, the rotary contacts $S_1$ and $S_2$ are again rotated one-fourth rotation. Consequently, the rotary contact $S_2$ comes into contact with the stationary contact $P_5$ which is positioned outside of the stationary contacts $P_2$ and $P_3$ and closer to the stationary contact $P_3$. Because the stationary contact $P_5$ is connected to one end of the solenoid 2 through the switch SW5$d$ of the changeover switch SW5 when a four-channel tape cartridge is playing, the solenoid 2 is energized to cause the head shifting cam 5 to rotate one step. This rotation of the cam 5 causes the rotary contact $S_1$ to move from the stationary contact $P_3$ to $P_4$ and the rotary contact $S_2$ to come into contact with the stationary contact $P_6$ which is positioned outside of the stationary contacts $P_3$ and $P_4$ and closer to the stationary contact $P_4$. Because the stationary contact $P_6$ is operatively connected to the solenoid 2 through the switch SW5$d$, the head shifting cam 5 is again rotated another step until the rotary contact S1 rotates to come into contact with the stationary contact $P_1$. In the mechanism described above, the head shifting cam 5 is continuously rotated two successive steps to be returned to its original position thereby skipping the two steps that are not used in the four-channel play. Thus, the head block H returns to the original highest level, and the first, third, fifth and seventh recording tracks are again started to play through the magnetic head $H_1$, $H_2$, $H_3$ and $H_4$.

When a two-channel tape cartridge is inserted into the cartridge type tape player, the discriminating ganged changeover switch SW5 is switched into the state opposite to that shown in FIG. 2. The switch SW5$c$ causes the two-channel mode indicator lamp $L_2$ to turn on. Again, assuming that the head block H is positioned at its highest level, the signals recorded on the first and fifth recording tracks 1' and 5' (which correspond to channel-1) are picked up respectively by the magnetic heads $H_1$ and $H_3$ and reproduced through the speakers $SP_1$, $SP_2$ and $SP_3$, $SP_4$ in two-channel stereo mode. At this time, because the output signals from the magnetic head $H_2$ and $H_4$ are disconnected from the main amplifier $MA_2$ and $MA_4$ by the disconnection of the switches SW5$a$ and SW5$b$, these signals may not be reproduced. Accordingly, when the electrically conducting strip short-circuits the contactor 3 at the end/start position of the tape, the head shifting cam 5 is rotated one step or one-fourth rotation to shift down the head block H so that the second and sixth tracks (channel-2), the third and seventh tracks (channel-3) and the fourth and eighth tracks (channel-4) come into play, in turn, in two-channel stereo mode.

Figure 3:
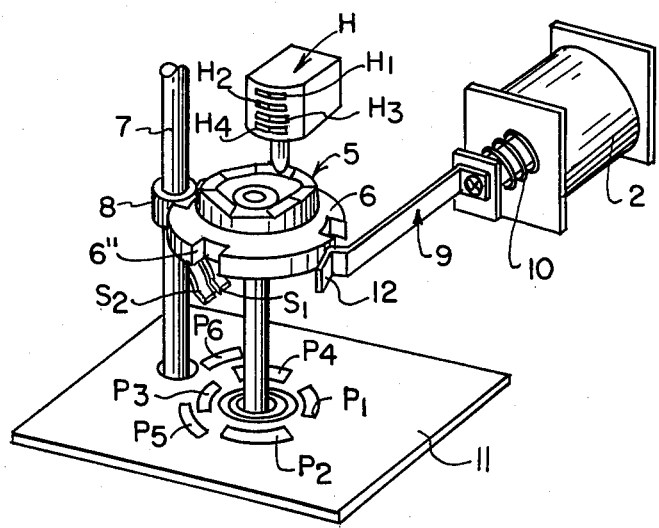

A preferred embodiment of the head shifting mechanism to be employed in the two-channel and four-channel cartridge tape player of the present invention is described with reference to FIG. 3, in which the parts corresponding to those shown in FIG. 2 are indicated by the same symbols or reference numerals. In FIG. 3, reference numeral 6 indicates a rotatable disc to which the four-stepped head shifting cam 5 is secured to the top surface thereof. The disc 6 is provided with four notches 6'' along its outer periphery edge, each notch being separated by 90°. One of the notches 6'' is generally positioned to be facing with capstan 7 or collar 8 secured thereto almost touching it. To the bottom surface of the disc 6 the rotary contacts $S_1$ and $S_2$ and another rotary contact for grounding (not shown in the drawing) are secured so that these rotary contacts may be in contact with the stationary contacts $P_1$, $P_2$, $P_3$, $P_4$, $P_5$ and $P_6$ which are secured to a printed board 11. The operation of the head shifting mechanism constructed as described above is as follows: when the end/start position of the tape is detected, a disc rotating means such as the electro-magnetic solenoid 2 attracts a lever 9 attached to the plunger thereof, the front end of which in turn comes into engagement with the notch 6''. With deenergizing the solenoid 2, the lever 9 is returned to its original position by a return spring 10. During the returning action of the lever 9, the front end thereof pushes the disc to rotate. Consequently the peripheral portion of the disc 6 abuts on the collar 8, such that the disc 6 is driven to rotate by the rotation of the capstan 7 until the following notch 6' comes into opposing to the collar 8 to complete the head shifting operation.

The head shifting mechanism of the present invention which utilizes the rotating energy of the capstan to drive the head shifting mechanism is particularly preferable for two-channel and four-channel cartridge tape players which are required to skip two steps of the four stepped cam when four-channel cartridge is in play. Such a mechanism enables the use of a small electromagnetic solenoid having reduced power consumption and eliminates the need of larger solenoids, as required by the prior art devices.

As is described above, the present invention provides an improved two-channel and four-channel cartridge tape player having simpler construction and less power consumption without considerable change in design of two-channel players of the prior art.

Although the present invention has been described with respect to a certain specific embodiment, it will be appreciated that modifications and changes may be made by those skilled in the art without departing from the true spirit and scope of the invention.

I claim:

1. A cartridge-type tape player adapted to receive and play two-channel and four-channel tape cartridges, and having amplifier means and output means connected to said amplifier means for receiving signals therefrom for audible reproduction thereof, said player including in combination:
   changeover switch means operable between a first position when a two-channel tape cartridge is inserted into the player and a second position when a four-channel tape cartridge is inserted into the player,
   magnetic tape head means having four magnetic pick-up areas, said tape head means being movable upon the insertion of two-channel and four-channel tape cartridges to align said pick up areas with selected tracks on the tape,
   head shifting means mounted in said player and movable between first, second, third and fourth positions, said head shifting means being engageable with said magnetic tape head means to move the same to align said pickup areas with selected tracks on the tape, said head shifting means includes a rotatable disc having a top and a bottom surface thereon and having a plurality of notches on the peripheral edge thereof, said top surface having four successive cam regions thereon which correspond to the four-channel tape tracks and said bottom surface having a pair of contacts mounted thereto and selectively engageable with said rotary switch means,
   drive means coupled to said head shifting means for rotating said head shifting means between said first, second, third and fourth positions, said drive means further includes a coupling member engageable with and driven by the capstan drive and positioned in a spaced relation for engagement with said rotatable disc to cause the same to be rotated by the coupling member, a solenoid, a lever adapted to engage a notch on the rotatable disc and magnetic linkage means coupled to the said lever, said solenoid operating to move said magnetic linkage means to cause said lever to engage said rotatable disc to move the same whereby said rotatable disc is engaged and rotated by the coupling on the capstan drive shaft to thereby position said pick-up areas on said magnetic tape head means with selected tracks on the tape,
   rotary switch means including a first switch portion and a second switch portion, means coupling said second switch portion to said drive means for actuating the same to move said head shifting means, and
   said drive means being responsive to operation of said second portion of said switch means to rotate said head shifting means between said first, second, third and fourth positions when said changeover switch means is in said first position and responsive to operation of said second switch portion of said rotary switch means to rotate said head shifting means to successive positions when said changeover switch means is in said second position.

2. The cartridge-type tape player in accordance with claim 1 wherein said first switch portion is coupled to an indicator means to indicate the tape track to which said pick-up area on said magnetic tape head is aligned with the tape.

3. The cartridge-type tape player in accordance with claim 2 wherein said first switch portion includes a rotary contact selectively engageable with four stationary contacts predeterminedly mounted to a printed board.

4. The cartridge-type tape player in accordance with claim 1 wherein said second switch portion includes a rotary contact selectively engageable with two stationary contacts predeterminedly mounted to a printed board.

* * * * *